United States Patent
Zhang

(10) Patent No.: US 12,167,171 B2
(45) Date of Patent: Dec. 10, 2024

(54) VEHICULAR VISION SYSTEM WITH OBJECT CLASSIFICATION BASED ON CHANGE IN ORIENTATION OF OBJECT

(71) Applicant: Magna Electronics Inc., Auburn Hills, MI (US)

(72) Inventor: Liang Zhang, Ottawa (CA)

(73) Assignee: Magna Electronics Inc., Auburn Hills, MI (US)

( * ) Notice: Subject to any disclaimer, the term of this patent is extended or adjusted under 35 U.S.C. 154(b) by 147 days.

(21) Appl. No.: 17/935,728

(22) Filed: Sep. 27, 2022

(65) Prior Publication Data

US 2023/0106188 A1    Apr. 6, 2023

Related U.S. Application Data

(60) Provisional application No. 63/262,103, filed on Oct. 5, 2021.

(51) Int. Cl.
*H04N 7/18* (2006.01)
*G06T 7/50* (2017.01)
(Continued)

(52) U.S. Cl.
CPC .............. *H04N 7/183* (2013.01); *G06T 7/50* (2017.01); *G06T 7/60* (2013.01); *G06T 7/70* (2017.01);
(Continued)

(58) Field of Classification Search
CPC ........ H04N 7/183; H04N 25/76; H04N 7/188; G06T 7/50; G06T 7/60; G06T 7/70;
(Continued)

(56) References Cited

U.S. PATENT DOCUMENTS 5,550,677 A    8/1996  Schofield et al.
5,670,935 A    9/1997  Schofield et al.
(Continued)

OTHER PUBLICATIONS

Hassaballah, M., Mourad A Kenk, and Ibrahim M. El-Henawy. "Local binary pattern-based on-road vehicle detection in urban traffic scene." Pattern Analysis and Applications 23.4 (Feb. 2020): 1505-1521. (Year: 2020).

(Continued)

*Primary Examiner* — Michael Lee
(74) *Attorney, Agent, or Firm* — HONIGMAN LLP

(57) ABSTRACT

A vehicular vision system includes a camera disposed at a vehicle and capturing image data. The vehicular vision system, via processing at an electronic control unit of a first frame of image data captured by the camera, detects a first object exterior of the vehicle and determines an attribute of the first object. The vehicular vision system, via processing at the electronic control unit of a second frame of image data captured by the camera, detects a second object exterior of the vehicle and determines the attribute of the second object. The system determines whether the first object and the second object are the same object based on a similarity measurement. The vehicular vision system, responsive to determining that the first object and the second object are the same object, merges the attribute of the first object with the attribute of the second object.

20 Claims, 14 Drawing Sheets

(51) Int. Cl.
*G06T 7/60* (2017.01)
*G06T 7/70* (2017.01)
*H04N 25/76* (2023.01)

(52) U.S. Cl.
CPC ... *H04N 25/76* (2023.01); *G06T 2207/10028* (2013.01); *G06T 2207/30261* (2013.01)

(58) Field of Classification Search
CPC . G06T 2207/10028; G06T 2207/30261; G06T 7/20; G06V 10/62; G06V 20/58
See application file for complete search history.

(56) References Cited

U.S. PATENT DOCUMENTS

| | | | |
|---|---|---|---|
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 8,581,983 | B2 | 11/2013 | Shi et al. |
| 9,205,776 | B2 | 12/2015 | Turk |
| 9,487,235 | B2 | 11/2016 | Bajpai et al. |
| 9,547,795 | B2 | 1/2017 | Gupta |
| 9,563,951 | B2 | 2/2017 | Okouneva |
| 9,619,716 | B2 | 4/2017 | Pflug |
| 9,898,671 | B2 | 2/2018 | Gupta et al. |
| 9,946,940 | B2 | 4/2018 | Gupta et al. |
| 10,071,687 | B2 | 9/2018 | Ihlenburg et al. |
| 10,078,789 | B2 | 9/2018 | Gupta et al. |
| 10,095,935 | B2 | 10/2018 | Gupta |
| 10,099,614 | B2 | 10/2018 | Diessner |
| 10,204,279 | B2 | 2/2019 | Gupta et al. |
| 10,210,399 | B2 | 2/2019 | Sabeti |
| 10,210,404 | B2 | 2/2019 | Gupta et al. |
| 10,268,904 | B2 | 4/2019 | Gupta |
| 10,449,899 | B2 | 10/2019 | Gupta et al. |
| 10,452,931 | B2 | 10/2019 | Gupta |
| 10,677,894 | B2 | 6/2020 | Wodrich et al. |
| 10,691,943 | B1* | 6/2020 | Ferstl ..................... B64D 47/08 |
| 10,713,506 | B2 | 7/2020 | Gupta et al. |
| 10,755,110 | B2 | 8/2020 | Bajpai |
| 10,883,846 | B2 | 1/2021 | Seifert |
| 11,175,516 | B1 | 11/2021 | Canberk et al. |
| 2013/0142426 | A1 | 6/2013 | Kaneda et al. |
| 2014/0193071 | A1 | 7/2014 | Cho et al. |
| 2016/0180158 | A1 | 6/2016 | Gupta et al. |
| 2016/0210728 | A1* | 7/2016 | Tojo ....................... G06V 10/56 |
| 2018/0307911 | A1 | 10/2018 | Zohourian et al. |
| 2019/0258878 | A1* | 8/2019 | Koivisto ................ G06N 3/084 |
| 2020/0160538 | A1* | 5/2020 | Daniel .................... G06T 7/248 |
| 2021/0035273 | A1 | 2/2021 | Deng et al. |
| 2021/0216752 | A1 | 7/2021 | Trani et al. |
| 2022/0044064 | A1* | 2/2022 | Zhang .................... G06V 20/44 |
| 2022/0101024 | A1 | 3/2022 | Zhang et al. |
| 2022/0189264 | A1* | 6/2022 | Oami ........................ G06T 7/70 |
| 2022/0383662 | A1* | 12/2022 | Javan Roshtkhari .... G06N 3/08 |
| 2023/0014519 | A1* | 1/2023 | Choi .................... H04N 21/232 |
| 2023/0085024 | A1* | 3/2023 | Zhang .................... G06T 7/20 382/103 |
| 2023/0086389 | A1* | 3/2023 | Wu ........................ G06V 20/36 463/31 |
| 2023/0368411 | A1* | 11/2023 | Zhang .................... H04N 25/76 |

OTHER PUBLICATIONS

Karis, Mohd Safirin, et al. "Local Binary Pattern (LBP) with application to variant object detection: A survey and method." 2016 IEEE 12th International Colloquium on Signal Processing & Its Applications (CSPA). IEEE, 2016. (Year: 2016).

Xu, Xue-mei, et al. "Vehicle detection algorithm based on codebook and local binary patterns algorithms." Journal of Central South University 22.2 (2015): 593-600. (Year: 2015).

* cited by examiner

VEHICULAR VISION SYSTEM WITH OBJECT CLASSIFICATION BASED ON CHANGE IN ORIENTATION OF OBJECT

CROSS REFERENCE TO RELATED APPLICATION

The present application claims the filing benefits of U.S. provisional application Ser. No. 63/262,103, filed Oct. 5, 2021, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular vision system includes a camera disposed at a vehicle equipped with the vehicular vision system. The camera views exterior of the vehicle and captures frames of image data. The camera includes a CMOS imaging array. The CMOS imaging array includes at least one million photosensors arranged in rows and columns. They system includes an electronic control unit (ECU) with electronic circuitry and associated software. The electronic circuitry of the ECU includes an image processor for processing frames of image data captured by the camera to detect presence of objects viewed by the camera. The vehicular vision system, via processing at the ECU of a first frame of image data captured by the camera, detects a first object exterior of the equipped vehicle. The vehicular vision system determines an attribute of the first object. The attribute includes a size of the first object. The vehicular vision system, after determining the attribute of the first object, and via processing at the ECU of a second frame of image data captured by the camera, detects a second object exterior of the equipped vehicle and determines the attribute of the second object. The vehicular vision system determines whether the first object and the second object are the same object based on a similarity measurement. The vehicular vision system, responsive to determining that the first object and the second object are the same object, merges the attribute of the first object with the attribute of the second object.

These and other objects, advantages, purposes and features of the present invention will become apparent upon review of the following specification in conjunction with the drawings.

DESCRIPTION OF THE PREFERRED EMBODIMENTS

A vehicular vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
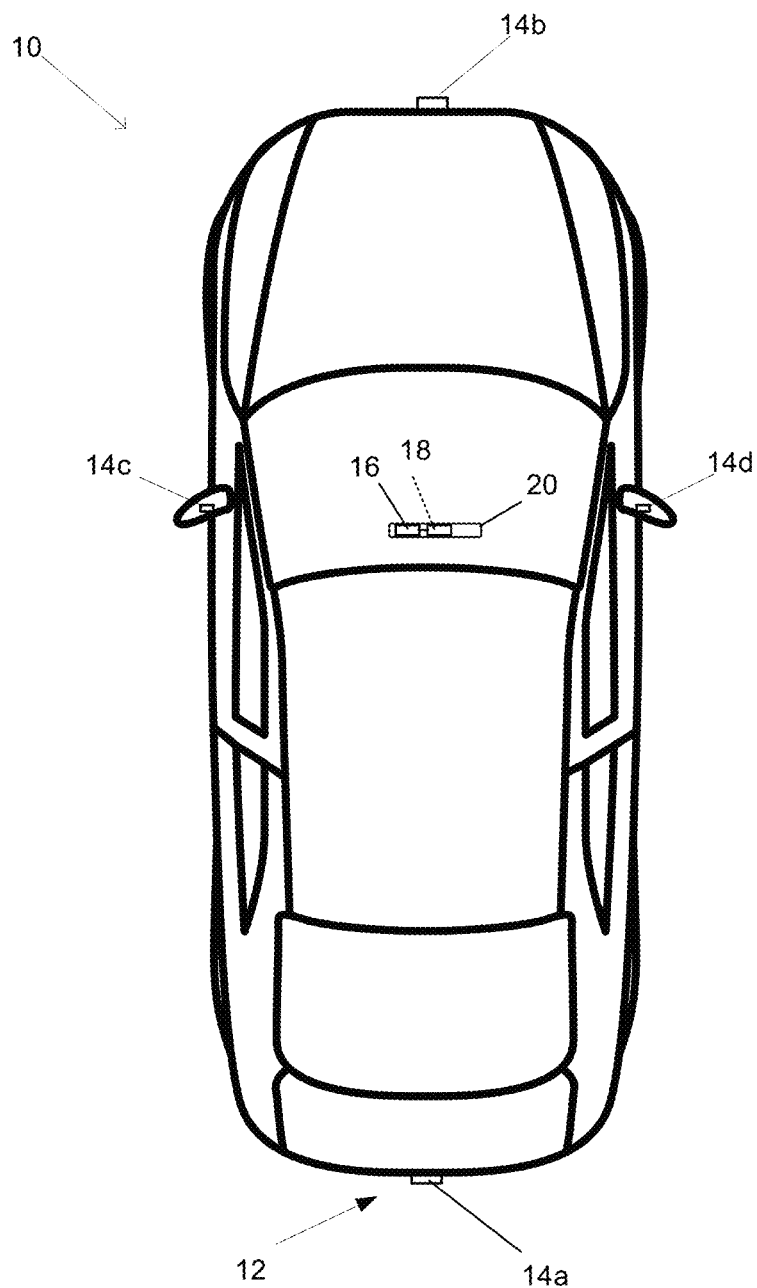
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a, such as a rear backup camera (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
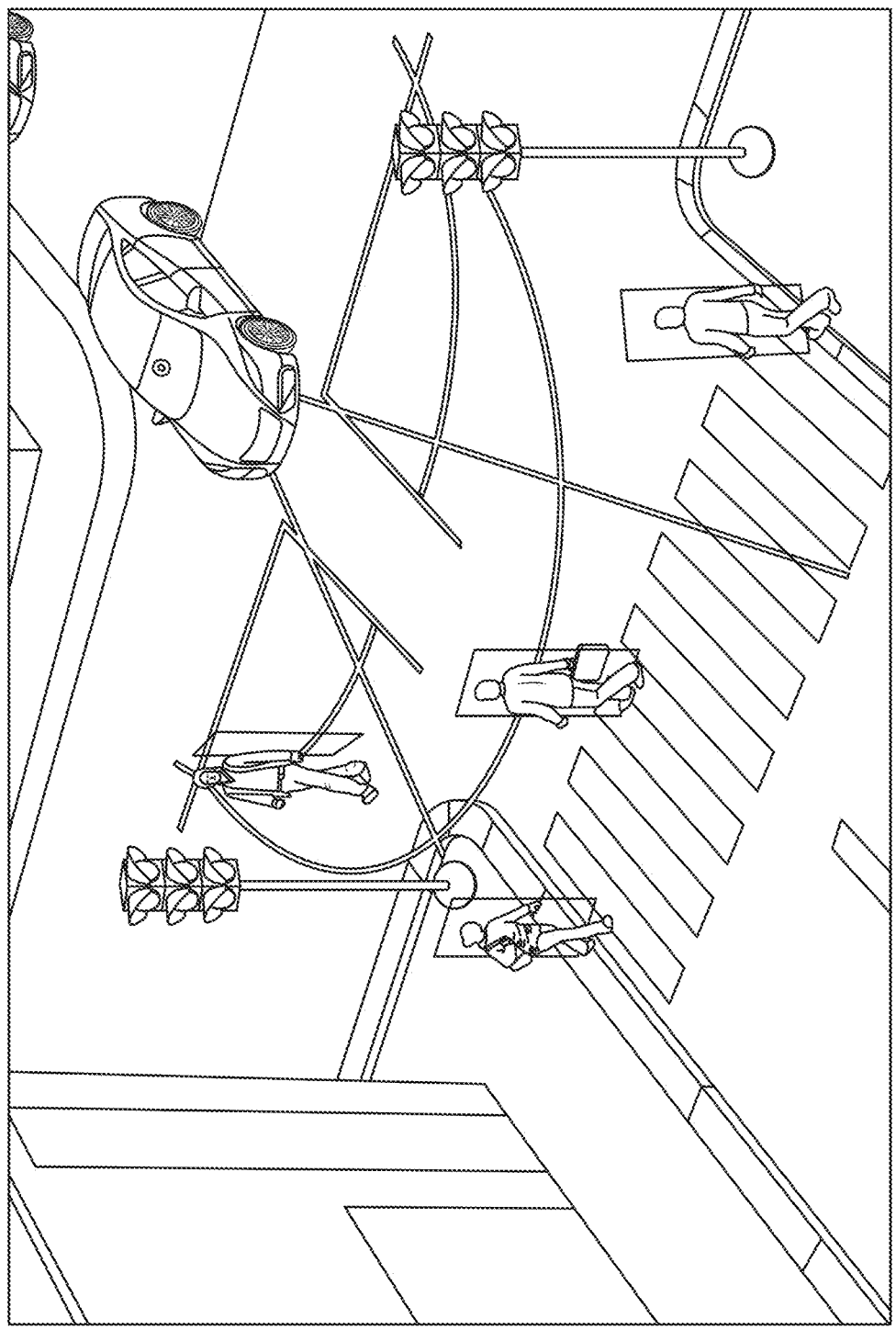
FIG. 2 is a perspective view of a vehicle performing object classification of a scene.
Figure 3:
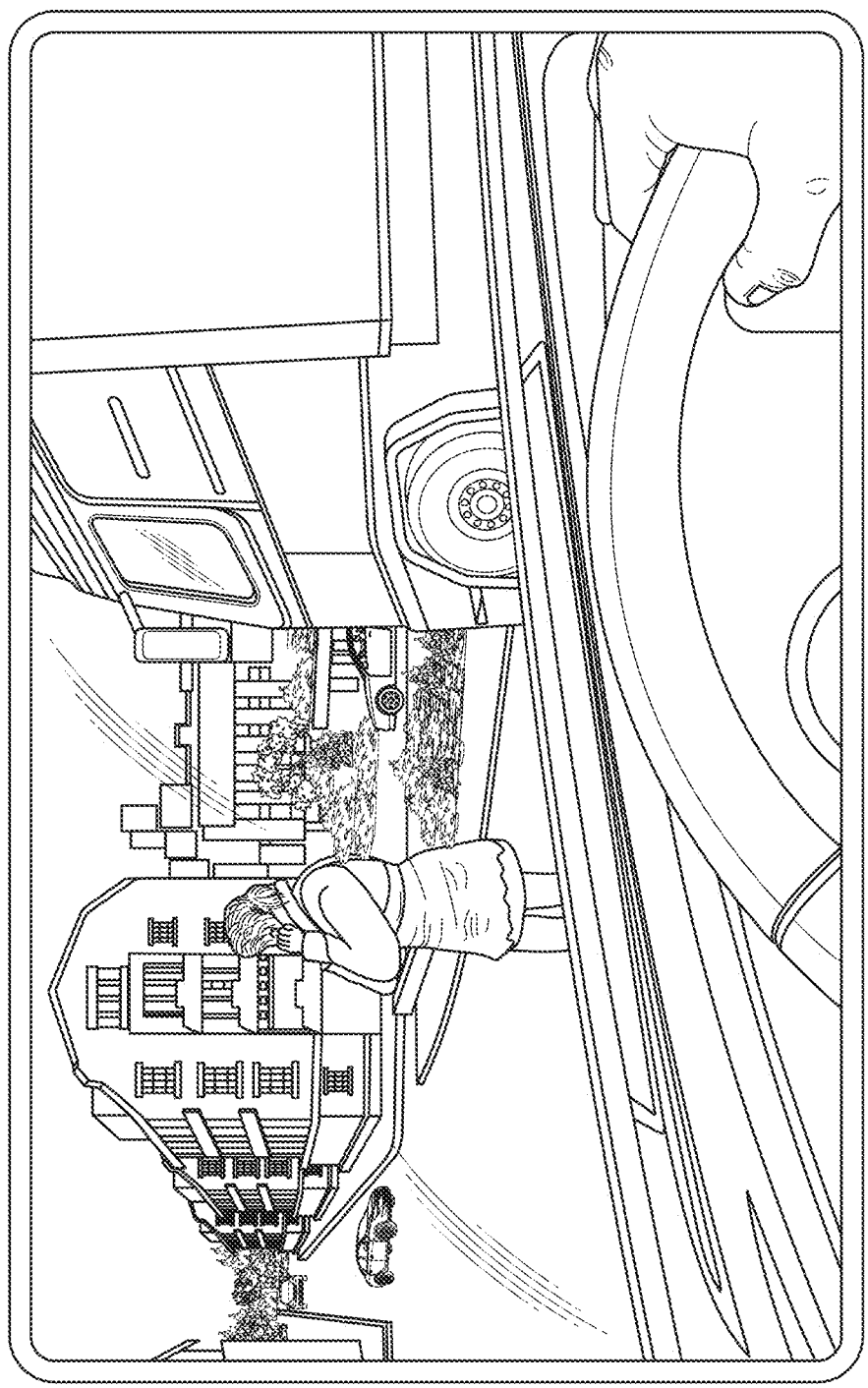
FIG. 3 is a perspective view of a pedestrian crossing in front of a vehicle.
Figure 4A:
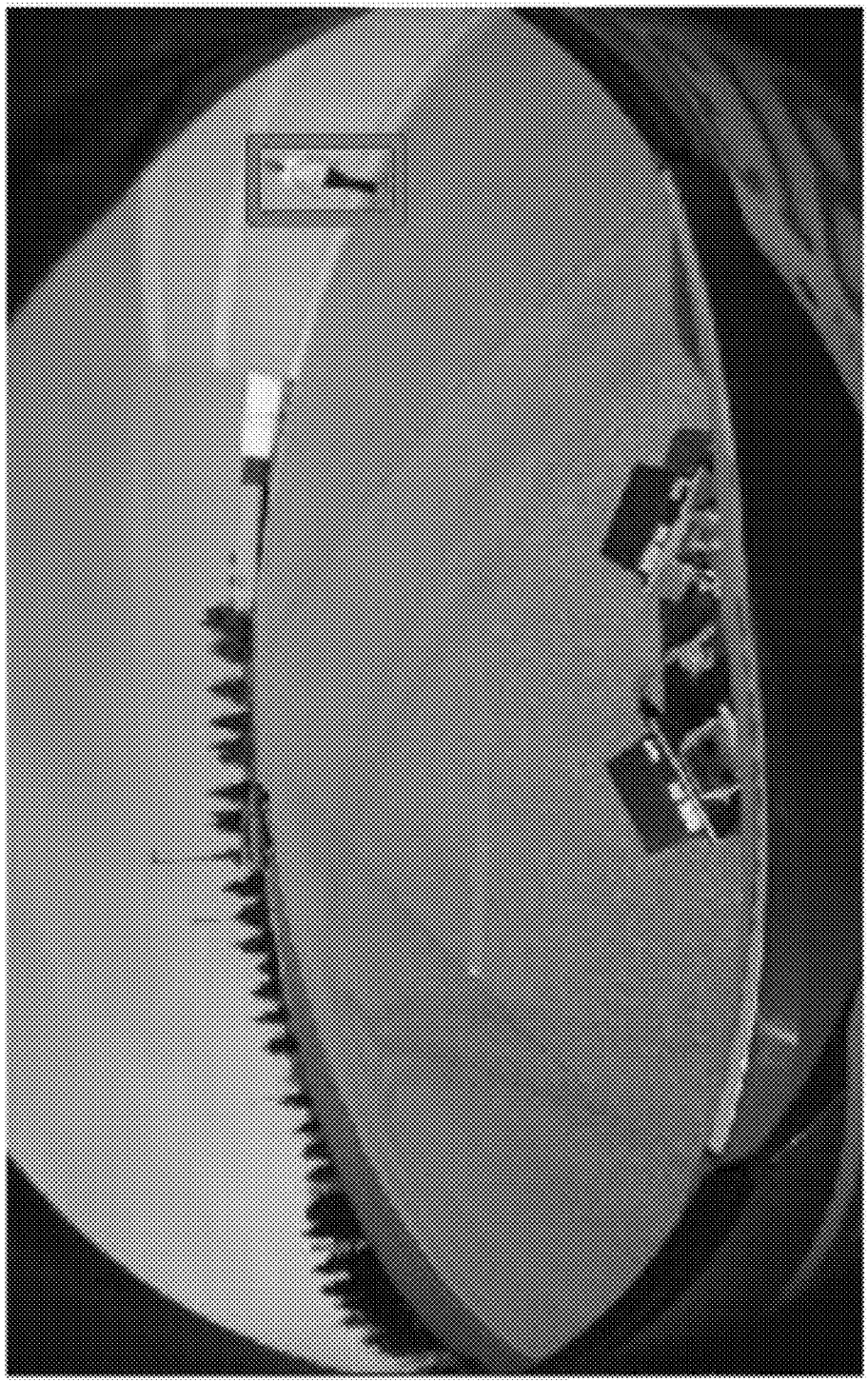
FIGS. 4A-4F are perspective views of the same pedestrian with different size, form, and orientation in frames of image data captured by a camera with a fisheye lens.
Figure 4B:
Figure 4C:
Figure 4D:
Figure 4E:
Figure 4F:
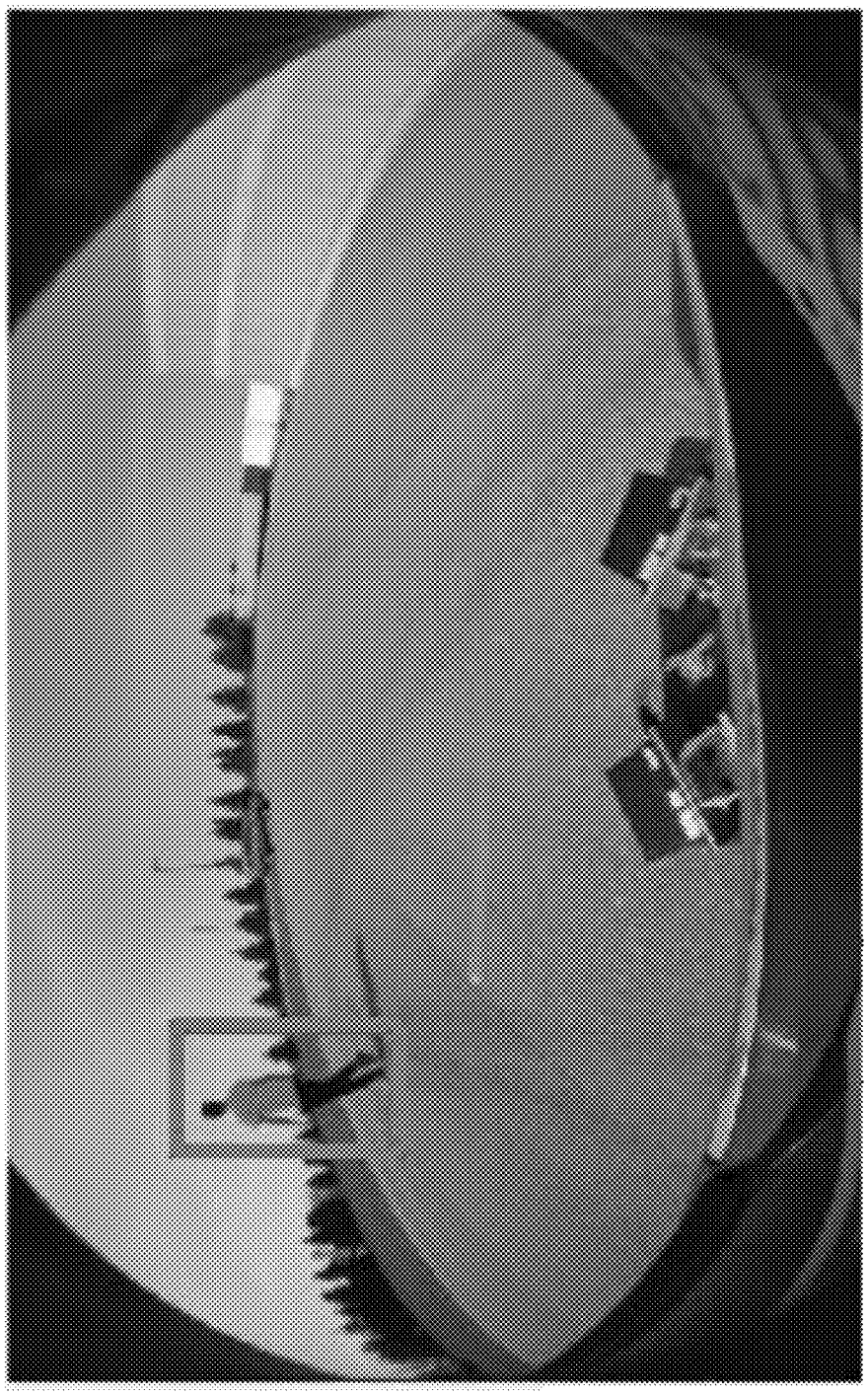

In today's vehicles, surround awareness and driver assistance is a marketable feature. For example, object detection and classification using one or more fisheye lens cameras (i.e., wide or ultra-wide field of view cameras) is common. Referring to FIGS. 2 and 3, object classification of a scene includes adding value to existing detection-based algorithms (e.g., pedestrian detection, vehicle detection, blind spot detection, automatic parking spot detection, etc.) by classifying objects detected within the field of view of one or more cameras.

Typically, object classification is a training-and-testing process based on an object model. The process defines how effectively the object model represents the objects and how the object model differentiates itself from other objects. Modern techniques for object classification include support vector machines, linear regression, logistic regression, K-nearest neighbor algorithms, neural networks (i.e., multilayer perception), extreme machine learning, and advanced deep learning technologies.

Figure 5A:
FIGS. 5A-5C are perspective views of the same vehicle with different size, form, and orientation in frames of image data captured by a camera with a fisheye lens.
Figure 5B:
Figure 5C:

Referring now to FIGS. 4A-4F, vehicle vision systems and other driver assistance systems are increasingly using fisheye optics to provide a wide angle field of view for the camera. However, because of distortion caused by fisheye optics (i.e., warping), features typically cannot be measured accurately in image data captured by fisheye lenses, as this may lead to a loss in accuracy of object representation or classification. The fisheye lens may also create classification performance issues due to variations in possible object representation. These problems are further compounded by the fact that objects can vary not only in size and form (based on position within the field of view of the camera), but also in orientation. FIGS. 4A-4F illustrate examples of the same pedestrian varying in size, form, and orientation in frames of image data captured by a camera equipped with a fisheye lens as the pedestrian walks across the field of view of the camera. Similarly, FIGS. 5A-5C illustrate examples of the same vehicle varying in size, shape, and orientation in frames of image data captured by a camera equipped with a fisheye lens as the vehicle travels through the field of view of the camera.

Existing object classification techniques deal with many issues, such as missing detections/classifications. For example, due to object variations in size, orientation and/or pose between trained models and the target object, existing object detection and/or classification methods cannot guarantee that they can detect the desired target object in each frame. Additionally, temporal inconsistencies of object detection/classification are error-prone due to the diversity between the trained model and the target object in object size and orientation. This error-prone detection may cause temporally inconsistent issues for the sequence outputs of the detected objects and miss-detection may exacerbate the temporal inconsistencies.

Figure 6:
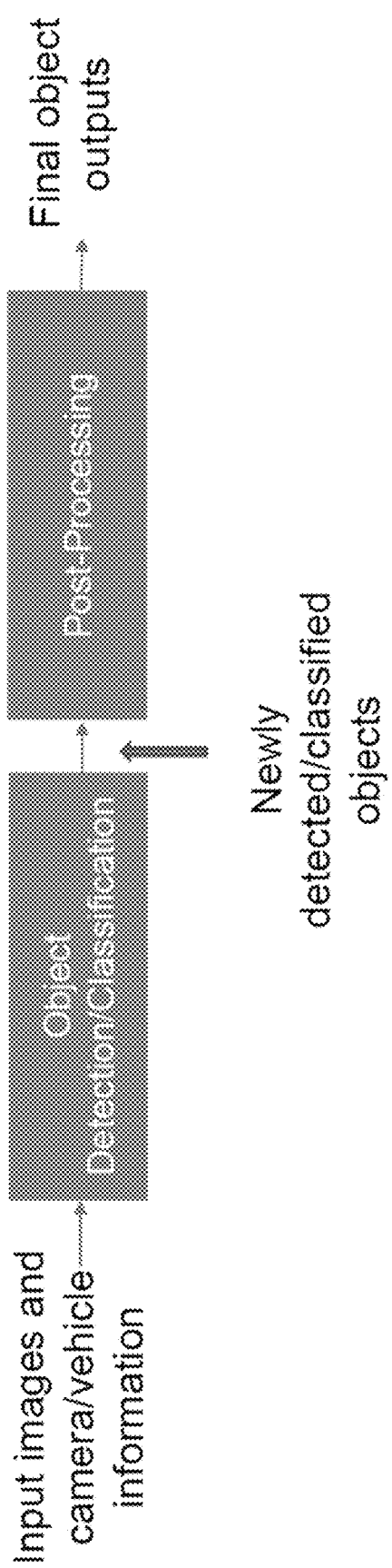
FIG. 6 is an exemplary block diagram of the vision system of FIG. 1.

Implementations herein include a vehicular vision system that includes an additional post-process step to mitigate these issues by providing a new detection when detection/classification algorithms fail to identify the target object and by smoothing final outputs using temporal filtering. As shown in FIG. 6, the object detection/classification algorithm of the vehicular vision system receives camera and/or vehicle information and input images from one or more cameras. Outputs from the object detection/classification algorithm are combined with newly detected/classified objects as described herein (i.e., detected using a current frame of image data and not yet associated/correlated with any object detected using previous frames of image data), which are then post-processed (e.g., smoothed) as final object outputs.

Object detection/classification is a learning based problem in which object models are first trained with pre-selected sample object segments. The trained models are then applied to check the testing object segments to identify the target objects. Examples of object detection/classification methods include support-vector machines (SVM), linear regression, logistic regression, K-nearest neighbor algorithms, neural networks (i.e., multilayer perception) for object detection/classification, such as pedestrian and vehicle detection.

Figure 7:
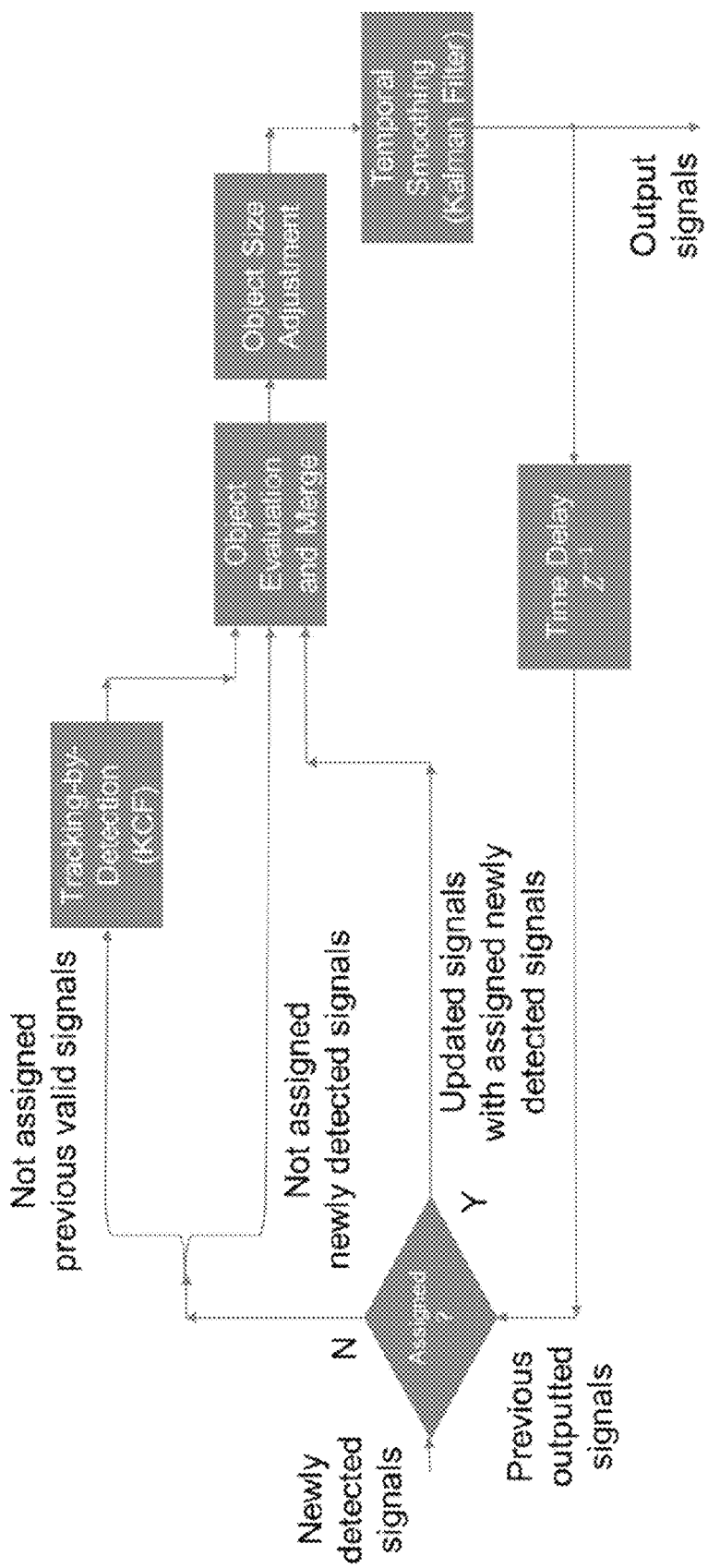
FIG. 7 is an exemplary flow chart of the system of FIG. 1.

Referring now to FIG. 7, the post-processing may include an assignment operator. The assignment operator compares newly detected objects (i.e., objects that are not currently correlated or associated with a previously detected and tracked object) with previously valid and tracked objects to see whether one newly detected object belongs to (i.e., at least partially matches) one of the previously detected valid objects. Optionally, the assignment operator may first perform an object similarity measurement between the current or newly detected object(s) and the tracked/previously detected objects. For example, the assignment operator may determine a distance between the newly detected object and the previously detected object. The assignment operator may build or generate a cost matrix (N×M), where N represents a number of newly detected objects and M represents a number of tracked objects. Next, the assignment operator may determine the best one-to-one match from this cost matrix by searching for the minimum distance using, for example, the Hungarian algorithm.

When the assignment exists (i.e., the new object matches, to a threshold degree, a previously detected object), the attributes of the previously detected valid object may be updated with the assigned newly detected object. The attributes from the newly detected object can include parameters such as an object distance (x, y), bounding box size, object confidence (e.g., a confidence the system has in detection and/or classification of the object), object heights, etc. Further post-processing (e.g., Kalman filter processing) may be performed to filter these attributes to avoid sudden jumps between previous attributes and new attributes. When the assignment does not exist, there may be two different cases. First, the unassigned newly detected object may be treated as a new object in the list of candidate objects. Second, the unassigned previously detected valid object may be further processed to find its new prediction.

Optionally, the system includes a tracking-by-detection operator. The tracking-by-detection operator uses tracking-by-detection technology (e.g., Kernelized Correlation Filter (KCF)) to track the unassigned previously detected valid object's location in the current frame of image data. An object evaluation/merge operator may receive three different kinds of possible inputs. First, the object evaluation/merge operator may receive tracked signals of unassigned previous valid signals. Second, the object evaluation/merge operator may receive unassigned newly detected signals. Third, the object evaluation/merge operator may receive updated signals with assigned newly detected signals (i.e., signals from a previously assigned object that matched with a newly detected object). These signals build a list of candidate objects in the current frame of captured image data and may be further evaluated and verified to reject invalid objects (such as false detections) and/or to merge objects which present the same real object based on certain criteria. Afterwards, the object evaluation/merge operator may generate a list of valid objects.

Optionally, the system performs an object size adjustment. Object size in frames of image data may vary from frame to frame due to, for example, relative movement of the object and/or vehicle. To overcome this issue, the object size in images may be updated through its 3D positions with an object height averaged over its object heights in previous frames. For example, for a newly detected object, object heights may be predefined based on the object type (e.g., the object classification, such as a vehicle, a pedestrian, etc.). Using the predefined height, the system may determine the object bounding box location in the frame of image data. When the object is new and has not been associated a previously tracked object, the object may then be tracked using, for example, the KCF algorithm. Using this tracked object bounding box, the system may recalculate the object height by, for example, back-projecting the top point of bounding box back to a coordinate in the real world which has the same coordinate (e.g., Cartesian coordinate) as the object base point. This newly calculated object height may be averaged with the previously determined object height and this averaged height may be the object height in the current frame of image data. When instead the newly detected object is assigned to a previously detected object, the object height from the newly detected object may be averaged with the object height of the assigned tracked object. This averaged object height will be the object height of the assigned object in the current frame of image data. Additionally or alternatively, a Kalman filter process may be used to replace or supplant the average operation.

Optionally, the system includes a temporal smoothing operator. The objects in the final list may be further filtered by the temporal smoothing operator (e.g., a Kalman filter) to smoothen temporal position variations and reset the Kalman filter if the filter does not converge. The filtered objects then become the final list of valid object outputs.

Thus, the vehicular vision system includes tracking-by-detection (e.g., via KCF) to provide an alternative solution for missed detection/classification of objects from conventional machine learning and deep learning algorithms. This improves the detection/classification rates of target objects and enhances the performance of the vehicular vision system. The system may additionally or alternatively provide temporal filtering. The temporal filtering operator (such as Kalman filter) may, in a final step, reduce temporal position variations of final valid target objects. Temporal filtering improves temporal consistency of outputted target objects. The system may utilize aspects of vehicle vision systems described in U.S. Pat. Nos. 10,452,931; 10,204,279 and/or 10,210,404, and/or U.S. Publication No. US-2022-0101024, and/or U.S. patent application Ser. No. 17/930,788, filed Sep. 9, 2022, which are all hereby incorporated herein by reference in their entireties.

The methods and systems described herein may determine the motion or path of the vehicle responsive to vehicle system inputs, such as inputs from or indicative of the vehicle steering wheel angle and/or vehicle speed and/or the like, and determines the motion and relative motion of an object in the field of view of the camera. The system of the present invention may utilize aspects of the systems described in U.S. Pat. Nos. 9,946,940; 10,713,506; 9,898,671; 9,487,235; 9,547,795; 9,563,951; 9,205,776; 10,078,789; 10,095,935; 10,210,399; 10,755,110; 10,449,899; 10,268,904, and/or U.S. Publication No. US-2016-0180158, which are all hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472;

US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:
    a camera disposed at a vehicle equipped with the vehicular vision system, the camera viewing exterior of the vehicle, wherein the camera captures frames of image data;
    wherein the camera comprises a CMOS imaging array, and wherein the CMOS imaging array comprises at least one million photosensors arranged in rows and columns;
    an electronic control unit (ECU) comprising electronic circuitry and associated software;
    wherein the electronic circuitry of the ECU comprises an image processor for processing frames of image data captured by the camera to detect presence of objects viewed by the camera;
    wherein the vehicular vision system, via processing at the ECU of a first frame of image data captured by the camera, detects a first object exterior of the equipped vehicle;
    wherein the vehicular vision system determines an attribute of the first object, and wherein the attribute comprises size of the first object;
    wherein the vehicular vision system, after determining the attribute of the first object, and via processing at the ECU of a second frame of image data captured by the camera, detects a second object exterior of the equipped vehicle and determines the attribute of the second object;
    wherein the vehicular vision system determines whether the first object and the second object are the same object based on a similarity measurement;
    wherein the vehicular vision system, responsive to determining that the first object and the second object are the same object, merges the attribute of the first object with the attribute of the second object; and
    wherein the vehicular vision system, responsive to merging the attribute of the first object with the attribute of the second object, performs an object size adjustment on the first object.

2. The vehicular vision system of claim 1, wherein the vehicular vision system, responsive to determining that the first object and the second object are not the same object, tracks the second object in subsequent frames of captured image data.

3. A vehicular vision system, the vehicular vision system comprising:
    a camera disposed at a vehicle equipped with the vehicular vision system, the camera viewing exterior of the vehicle, wherein the camera captures frames of image data;
    wherein the camera comprises a CMOS imaging array, and wherein the CMOS imaging array comprises at least one million photosensors arranged in rows and columns;
    an electronic control unit (ECU) comprising electronic circuitry and associated software;
    wherein the electronic circuitry of the ECU comprises an image processor for processing frames of image data captured by the camera to detect presence of objects viewed by the camera;
    wherein the vehicular vision system, via processing at the ECU of a first frame of image data captured by the camera, detects a first object exterior of the equipped vehicle;
    wherein the vehicular vision system determines an attribute of the first object, and wherein the attribute comprises size of the first object;
    wherein the vehicular vision system, after determining the attribute of the first object, and via processing at the ECU of a second frame of image data captured by the camera, detects a second object exterior of the equipped vehicle and determines the attribute of the second object;
    wherein the vehicular vision system determines whether the first object and the second object are the same object based on a similarity measurement;
    wherein the vehicular vision system, responsive to determining that the first object and the second object are the same object, merges the attribute of the first object with the attribute of the second object;
    wherein the vehicular vision system, responsive to determining that the first object and the second object are not the same object, tracks the second object in subsequent frames of captured image data; and
    wherein the vehicular vision system, responsive to determining that the first object and the second object are not the same object, updates predefined attributes of the second object based on processing at the ECU of the second frame of image data captured by the camera.

4. The vehicular vision system of claim 2, wherein the vehicular vision system tracks the second object using a tracking-by-detection algorithm.

5. The vehicular vision system of claim 4, wherein the tracking-by-detection algorithm comprises a Kernelized Correlation Filter.

6. The vehicular vision system of claim 2, wherein the vehicular vision system, responsive to determining that the first object and the second object are not the same object, tracks the first object in subsequent frames of captured image data.

7. The vehicular vision system of claim 1, wherein the vehicular vision system temporally filters the first object.

8. The vehicular vision system of claim 7, wherein the vehicular vision system temporally filters the first object using a Kalman filter.

9. The vehicular vision system of claim 1, wherein merging the attribute of the first object with the attribute of the second object comprises averaging the attribute of the first object with the attribute of the second object.

10. The vehicular vision system of claim 1, wherein the attribute further comprises (i) an object distance relative to the vehicle, (ii) an object confidence score representing a confidence of the vehicular vision system in detection of the first object and (iii) an object bounding box size.

11. The vehicular vision system of claim 1, wherein the vehicular vision system determines whether the first object and the second object are the same object using a cost matrix and a distance between the first object and the second object.

12. A vehicular vision system, the vehicular vision system comprising:
a camera disposed at a vehicle equipped with the vehicular vision system, the camera viewing exterior of the vehicle, wherein the camera captures frames of image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing frames of image data captured by the camera to detect presence of objects viewed by the camera;
wherein the vehicular vision system, via processing at the ECU of a first frame of image data captured by the camera, detects a first object exterior of the equipped vehicle;
wherein the vehicular vision system determines a plurality of attributes of the first object, and wherein the plurality of attributes comprises (i) size of the first object and (ii) a distance from the vehicle;
wherein the vehicular vision system, after determining the plurality of attributes of the first object, and via processing at the ECU of a second frame of image data captured by the camera, detects a second object exterior of the equipped vehicle and determines the plurality of attributes of the second object;
wherein the vehicular vision system determines whether the first object and the second object are the same object based on a similarity measurement, and wherein the similarity measurement comprises a distance between the first object and the second object;
wherein the vehicular vision system, responsive to determining that the first object and the second object are the same object, merges the each of the plurality of attributes of the first object with the plurality of attributes of the second object; and
wherein the vehicular vision system, responsive to merging the attribute of the first object with the attribute of the second object, performs an object size adjustment on the first object.

13. A vehicular vision system, the vehicular vision system comprising:
a camera disposed at a vehicle equipped with the vehicular vision system, the camera viewing exterior of the vehicle, wherein the camera captures frames of image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing frames of image data captured by the camera to detect presence of objects viewed by the camera;
wherein the vehicular vision system, via processing at the ECU of a first frame of image data captured by the camera, detects a first object exterior of the equipped vehicle;
wherein the vehicular vision system determines a plurality of attributes of the first object, and wherein the plurality of attributes comprises (i) size of the first object and (ii) a distance from the vehicle;
wherein the vehicular vision system, after determining the plurality of attributes of the first object, and via processing at the ECU of a second frame of image data captured by the camera, detects a second object exterior of the equipped vehicle and determines the plurality of attributes of the second object;
wherein the vehicular vision system determines whether the first object and the second object are the same object based on a similarity measurement, and wherein the similarity measurement comprises a distance between the first object and the second object;
wherein the vehicular vision system, responsive to determining that the first object and the second object are the same object, merges the each of the plurality of attributes of the first object with the plurality of attributes of the second object; and
wherein the vehicular vision system, responsive to determining that the first object and the second object are not the same object, updates predefined attributes of the second object based on processing at the ECU of the second frame of image data captured by the camera.

14. The vehicular vision system of claim 12, wherein the vehicular vision system, wherein the vehicular vision system, responsive to determining that the first object and the second object are not the same object, tracks the second object using a tracking-by-detection algorithm.

15. The vehicular vision system of claim 14, wherein the tracking-by-detection algorithm comprises a Kernelized Correlation Filter.

16. The vehicular vision system of claim 12, wherein the plurality of attributes further comprises a confidence score representing a confidence of the vehicular vision system in detection of the first object.

17. A vehicular vision system, the vehicular vision system comprising:
a camera disposed at a vehicle equipped with the vehicular vision system, the camera viewing exterior of the vehicle, wherein the camera captures frames of image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing frames of image data captured by the camera to detect presence of objects viewed by the camera;
wherein the vehicular vision system, via processing at the ECU of a first frame of image data captured by the camera, detects a first object exterior of the equipped vehicle;
wherein the vehicular vision system determines an attribute of the first object, and wherein the attribute comprises size of the first object;
wherein the vehicular vision system, after determining the attribute of the first object, and via processing at the ECU of a second frame of image data captured by the camera, detects a second object exterior of the equipped vehicle and determines the attribute of the second object;

wherein the vehicular vision system determines whether the first object and the second object are the same object based on a similarity measurement;

wherein the vehicular vision system, responsive to determining that the first object and the second object are the same object, merges the attribute of the first object with the attribute of the second object; and wherein the vehicular vision system, responsive to merging the attribute of the first object with the attribute of the second object, performs an object size adjustment on the first object, and wherein the object size adjustment comprises averaging a height of the first object with a height of the second object.

18. The vehicular vision system of claim 17, wherein the vehicular vision system temporally filters the first object.

19. The vehicular vision system of claim 18, wherein the vehicular vision system temporally filters the first object using a Kalman filter.

20. The vehicular vision system of claim 17, wherein the vehicular vision system tracks the first object using a tracking-by-detection algorithm.

* * * * *